(12) United States Patent
Sigl

(10) Patent No.: US 12,435,409 B2
(45) Date of Patent: Oct. 7, 2025

(54) APPARATUS, METHOD AND SYSTEM FOR COATING A SUBSTRATE, IN PARTICULAR A SUPERCONDUCTING TAPE CONDUCTOR AND COATED SUPERCONDUCTING TAPE CONDUCTOR

(71) Applicant: Theva Dünnschichttechnik GmbH, Ismaning (DE)

(72) Inventor: Georg Sigl, Neubiberg (DE)

(73) Assignee: THEVA DÜNNSCHICHTTECHNIK GMBH, Ismaning (DE)

( * ) Notice: Subject to any disclaimer, the term of this patent is extended or adjusted under 35 U.S.C. 154(b) by 170 days.

(21) Appl. No.: 16/945,430

(22) Filed: Jul. 31, 2020

(65) Prior Publication Data

US 2021/0062328 A1    Mar. 4, 2021

(30) Foreign Application Priority Data

Aug. 30, 2019   (EP) .................................... 19194710

(51) Int. Cl.
*C23C 14/56* (2006.01)
*B05C 5/02* (2006.01)
(Continued)

(52) U.S. Cl.
CPC .............. *C23C 14/562* (2013.01); *B05C 5/02* (2013.01); *C23C 14/228* (2013.01); *H01B 12/06* (2013.01)

(58) Field of Classification Search
None
See application file for complete search history.

(56) References Cited

U.S. PATENT DOCUMENTS 4,147,534 A    4/1979  Hori
4,480,677 A    11/1984 Henson et al.
(Continued)

FOREIGN PATENT DOCUMENTS

CN    101072893 A    11/2007
CN    102177272 A    9/2011
(Continued)

OTHER PUBLICATIONS

Extended European Search Report mailed Jul. 1, 2020 in the corresponding European Application No. 19147 10.0, filed Aug. 30, 2019, in 18 pages.
(Continued)

*Primary Examiner* — Jethro M. Pence
(74) *Attorney, Agent, or Firm* — Knobbe, Martens, Olson & Bear, LLP

(57) ABSTRACT

The present invention relates to a method for coating a substrate, in particular a superconducting tape conductor, in a vacuum environment, comprising: generating a metallic material in the gas phase, feeding the gaseous metallic material into an expansion chamber, wherein the expansion chamber is adapted to cause the gaseous metallic material to expand and be directed towards the substrate, and depositing the metallic material on at least part of the surface of the substrate. Further, the present invention relates to a coated superconducting tape conductor comprising: at least one superconducting layer and at least one metallic coating deposited on the tape conductor, wherein the thickness of the metallic coating is at least 1 μm and varies over the width of the coated tape conductor by no more than 10%, preferably no more than 5%.

12 Claims, 4 Drawing Sheets

Figure 1:
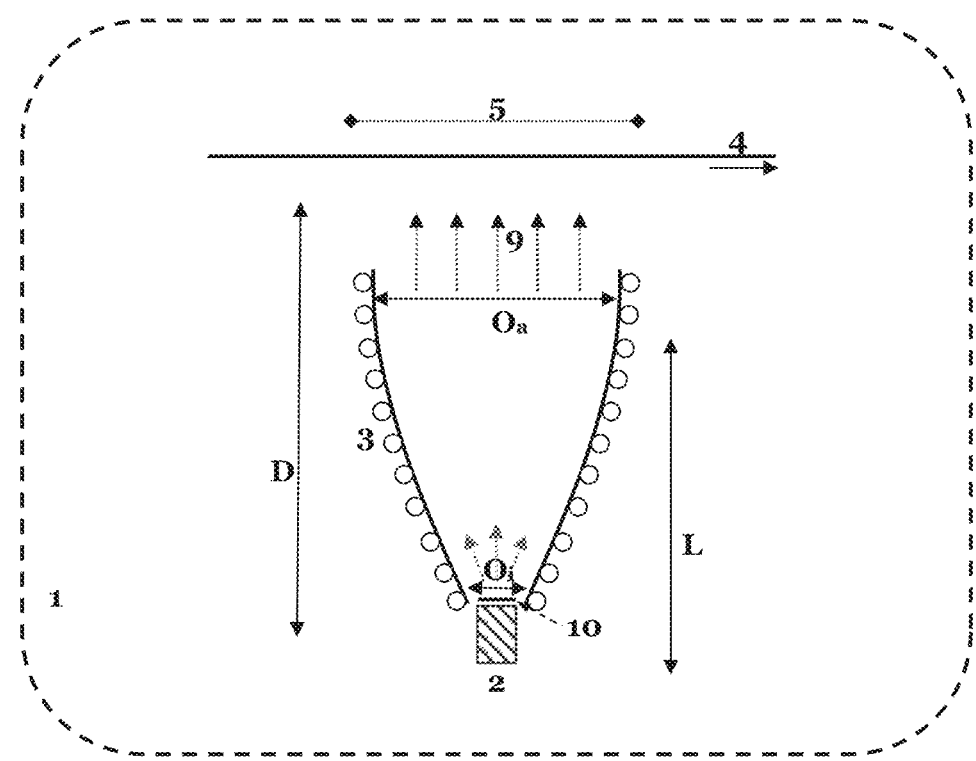

(51) Int. Cl.
    *C23C 14/22*     (2006.01)
    *H01B 12/06*     (2006.01)

(56) References Cited

U.S. PATENT DOCUMENTS

| | | | | |
|---|---|---|---|---|
| 4,788,082 | A | * | 11/1988 | Schmitt ............... H01M 4/0471 427/255.6 |
| 5,725,672 | A | * | 3/1998 | Schmitt ..................... B22F 9/12 118/726 |
| 8,136,480 | B2 | * | 3/2012 | Yumoto .................. C23C 14/22 118/723 R |
| 2005/0011747 | A1 | | 1/2005 | Selvamanickam et al. |
| 2008/0113870 | A1 | | 5/2008 | Lee et al. |
| 2011/0000431 | A1 | * | 1/2011 | Banaszak ............... C23C 14/562 118/694 |
| 2012/0088038 | A1 | | 4/2012 | Prusseit |
| 2012/0251710 | A1 | * | 10/2012 | Jang ....................... B82Y 40/00 423/325 |
| 2014/0197554 | A1 | * | 7/2014 | Bonsch ................ B01F 23/235 261/37 |
| 2018/0209021 | A1 | | 7/2018 | Chaleix et al. |

FOREIGN PATENT DOCUMENTS

| | | |
|---|---|---|
| JP | S57-155375 A | 9/1982 |
| JP | H02200771 A | 8/1990 |
| JP | 2008 195996 A | 8/2008 |
| JP | 2011-216670 A | 10/2011 |
| JP | 2009-102713 A | 3/2014 |
| JP | 2015 067865 A | 4/2015 |
| JP | 2013-508559 A | 4/2016 |
| JP | 2018-141208 A | 9/2018 |
| JP | 2022-126670 A | 8/2022 |
| KR | 10-1993-0018051 A | 9/1993 |
| KR | 10-2004-0031700 A | 4/2004 |
| KR | 100772014 B1 | 10/2007 |
| KR | 10 2018 0011355 A1 | 1/2018 |
| WO | WO 2010/013305 A1 | 2/2010 |

OTHER PUBLICATIONS

Office Action issued in corresponding Japanese application No. 2020-140223, dated Jul. 3, 2023.
Yumoto et al., "In-vitro study on apatite/titanium composite coatings with supersonic free-jet PVD", *Science and Engineering of Composite Materials*, vol. 18, No. 4, Dec. 1, 2011, in 5 pages.
First Office Action dated Oct. 27, 2023 in Chinese Application No. 202010878315.1 in 41 pages.
Office Action dated Jun. 4, 2024 issued in Korean Application No. 10-2020-0108736 in 5 pages.
Notification of Registration and Granting issued on Feb. 27, 2025 in CN Patent Application No. 202010878315.1, in 8 pages.

\* cited by examiner

APPARATUS, METHOD AND SYSTEM FOR COATING A SUBSTRATE, IN PARTICULAR A SUPERCONDUCTING TAPE CONDUCTOR AND COATED SUPERCONDUCTING TAPE CONDUCTOR

This application claims priority to European Patent Application No. 19194710.0, filed on Aug. 30, 2019, in the European Patent Office, the disclosure of which is incorporated herein in its entirety by reference.

1. TECHNICAL FIELD

The present invention relates to a method and apparatus for metallizing substrates, in particular heat-sensitive thin substrates, such as foils, belts for electronics and high temperature superconductor (HTS) tape conductors. In particular, dense, electrically highly conductive metal layers, e.g. of precious metals such as gold, silver, copper, tin and their alloys (e.g. bronze), are to be deposited on such substrates with a high depositing rate and high material yield.

2. PRIOR ART

For depositing metallic protection or contact layers, a wide variety of prior art processes are known. Electroplating is often used for metallic substrates, as material is selectively deposited on the substrate surface and thus a high material yield can be guaranteed.

For thick metal layers, so-called plasma spraying or screen printing pastes with metallic nanoparticles are also frequently used. Plasma spraying or particle spraying usually takes place at atmospheric pressure. In order to achieve a straightening effect, nozzles are occasionally used. When spraying cold particles, WO 2008/074064 A1 suggests the use of a nozzle to direct the particles of a powder carried by a process gas onto the substrate with high kinetic energy. This application is limited to high gas pressures of the process gas, because the process gas must accelerate the entrained powder particles by collisions.

PVD (physical vapor deposition) techniques are commonly used for thin films—such as sputtering or high-vacuum deposition from heated boats or crucibles. This allows the production of very dense, smooth metal layers, but often only very thin.

In order to ensure sufficient heat dissipation, for example, film substrates can be passed over a cooled roller in the coating area and the heat can be dissipated to the rear. Such an arrangement is described for example in U.S. Pat. No. 7,871,667. However, this has the disadvantage that the angle of incidence varies considerably in the coating area due to the circular arc, which can lead to local shading effects and columnar growth of the coating.

However, all these processes also have other specific disadvantages, especially if the substrate is sensitive to aggressive chemicals and/or high temperatures. In electroplating, for example, aggressive electrolytes (strongly acidic or cyanide) are usually used, which can attack sensitive substrate types or coatings. In addition, the substrate surface must have good electrical conductivity everywhere so that depositing is uniform. At corners and edges of the substrate, thickening, the so-called dog-bone effect, almost inevitably occurs due to electric field enhancement, so that the coating is not uniform at the edges, especially with thin substrates. Such unevenly coated substrates can therefore be poorly suited for applications such as densely packed magnet coils.

In addition, hydrogen is also released during electrolysis and incorporated into the metal, which can change (e.g. via hydrogen embrittlement) the properties of materials (e.g. of copper). Furthermore, there is a risk of fluid retention in pockets or cavities, especially in the case of foil- or tape-shaped substrates that already carry other functional layers, as may be the case with HTS tape conductors, for example. This can lead to corrosion or bubble formation (so-called ballooning) during soldering.

Plasma spraying generates a high local heat input and leads to very porous layers, so it is prohibited for sensitive substrates. Screen printing pastes or inks must also be subjected to thermal treatment after application to drive out organic solvents and then exhibit a high pore density. A conformal or homogeneous coating of the substrate is therefore difficult to achieve and adhesion at edges is problematic.

Wet-chemical coating processes or plasma or particle spray processes, which can also be used to apply thick metal layers, consistently produce layers with high porosity and surface roughness, since metal particles that are present are baked together. The particle diameter thus also determines the size of gaps and the surface quality.

PVD processes, on the other hand, deliver very homogeneous, smooth and dense layers at low deposition rates of a few nm/s and substrate temperatures <100° C. In sputtering, however, the substrate is very close to the plasma and the high-energy ions lead to high heat input. Besides metal atoms and ions, clusters of metal fragments can also be released during sputtering. As a result, metal layers grow significantly rougher than in vaporization, where the vaporization source is far away from the substrate and the metal atoms impinge on it at thermal velocities.

At low coating rates, however, these PVD processes are generally not economical for the production of thicker metal layers of more than 1 μm-3 μm.

Vacuum PVD methods are commonly used for thin metal coatings. High deposition rates are desirable for economic reasons, but with PVD coatings, high deposition rates and cold substrate support tend to produce columnar growth due to local shading effects, resulting in rough and porous layers. This phenomenon is well documented in the literature. See e.g. Donald M. Mattox, "*Handbook of physical vapour deposition (PVD) processing*", ISBN: 0-8155-1422-0, 1998, p. 498ff. and can be explained by the zone model of B. A. Movchan, A. V. Demchishin, Fiz. Met. Metalloved. 28 (1969) 653. The extremely high rate range with a deposition rate of >50 nm/s is not accessible with sputtering even with well-conductive metal targets using conventional PVD methods.

DE 10 2009 019146 describes measures to scatter the metal vapor directed at the chamber walls of a coating chamber back into the chamber and thus increase the yield. However, due to this and the ballistic preparation of the vapor from the source, a large part of the metal atoms hits the substrate tape undirected and partly at very flat angles. The necessary low substrate temperature and the flat impact at high coating rates inevitably lead to columnar growth of the coating, as described above. As a result, the layer may be interspersed with deep gaps and pores, and its hermeticity (protective function) and electrical conductivity may be severely impaired.

The present invention is intended to overcome at least some of the described disadvantages of the prior art and thus to offer an economical alternative for depositing homogeneous, dense metal layers with a high deposition rate and improved material yield. In particular, HTS tape conductors are to be provided with stabilizing metal layers or coatings at low cost.

3. SUMMARY OF THE INVENTION

The problems mentioned above are at least partially solved by the subject matter of the independent claims of the present invention. Exemplary embodiments are subject of the dependent claims.

In one embodiment, the present invention provides a method for coating a substrate, in particular a superconducting tape conductor, in a vacuum environment, said process comprising the following steps: producing a metallic material in the gas phase, feeding the gaseous metallic material into an expansion chamber, the expansion chamber being adapted to cause the gaseous metallic material to expand and be directed towards the substrate, and depositing the metallic material on at least part of the surface of the substrate.

In particular, the expansion chamber can be adapted to convert at least a lateral momentum component of the particles of the gaseous metallic material into a longitudinal momentum component in the direction of the substrate and/or be adapted to deposit the metallic material on at least part of the surface of the substrate and/or be adapted to generate a supersonic flow of the gaseous metallic material in the direction of the substrate and/or be adapted to direct the particles of the gaseous metallic material towards the substrate so that they impinge at an angle of no more than 15° preferably no more than 10° and most preferably no more than 5° to the surface normal of the substrate.

The invention can be applied, for example, to coating a substrate surface in a high vacuum by evaporation of a metal from a crucible or effusion cell. The crucible of the evaporation source or gas source can be heated by common means such as resistance heating, induction or an electron beam to such an extent that the metal to be evaporated melts therein and a gaseous metallic material is produced within the crucible.

The described method is characterized by very high deposition rates and material yield, which in turn leads to high throughput and favorable production costs. The process also avoids the columnar and porous layer growth that often occurs at high coating rates and results in a dense, smooth, and homogeneously thick metal layer that well conforms to the substrate shape, especially at the edges, and can thus also be used for homogeneous coating around the complete circumference of the substrate.

The process described above makes it possible to provide substrates such as HTS tape conductors with a very homogeneous, dense, hermetic and highly conductive metal coating. Coating thicknesses of more than 1 μm can be achieved at deposition rates of more than 20 nm/s, more than 50 nm/s and even more than 80 nm/s.

In addition, the described process can also achieve a very high material yield (i.e. ratio of deposited material on the substrate to the amount of evaporated material) of more than 50%, more than 70%, and even more than 80%. Furthermore, it can be achieved that the produced coating has essentially no pores or gaps.

Further a background gas pressure of at most $1 \cdot 10^{-1}$ Pascal, preferably of at most $1 \cdot 10^{-2}$ Pascal and more preferably of at most $1 \cdot 10^{-3}$ Pascal may be present in the vacuum environment.

This reduces unwanted oxidation of the coating material and/or the substrate. Further, it can also reduce hydrogen deposition in the substrate and/or the coating.

In alternative embodiments, the method may also be carried out in a suitable inert gas environment (e.g. Ar, $N_2$, etc.).

Further, the substrate may be moved past an outlet opening of the expansion chamber, preferably continuously, which allows the coating of substrates in foil or tape form of any length.

In some embodiments, the particles of the gaseous metallic material may have an average free path length of less than 1 mm, preferably less than 0.1 mm and more preferably less than 0.05 mm when flowing out of the gas source. Further, the vapor pressure of the metallic material in the gas source may be at least $10^1$ Pascals, preferably at least $10^2$ Pascals and more preferably at least $10^3$ Pascals.

Such process parameters result in the gaseous metallic material behaving approximately like a classical gas ensemble due to frequent collisions and interactions with each other. The expansion of the gaseous metallic material in the expansion chamber can convert thermal energy into kinetic energy and, if necessary, generate a supersonic flow in the direction of the substrate. Lateral momentum components of the metal particles are converted into forward components and the gas flow is directed parallel to the axis of the expansion chamber towards the substrate.

In a further embodiment, the present invention provides an apparatus for coating a substrate, in particular a superconducting tape conductor, the apparatus comprising: a gas source for generating a metallic material in the gas phase; wherein the gas source comprises an opening from which the gaseous metallic material flows into an expansion chamber, and wherein the expansion chamber is adapted to allow the gaseous metallic material to expand and be directed towards the substrate.

Further, as described above, the expansion chamber may be adapted to convert at least a lateral momentum component of the particles of the metallic material into a longitudinal momentum component in the direction of the substrate and/or be adapted to generate a supersonic flow of the gaseous metallic material towards the substrate and/or be arranged to direct the particles of gaseous metallic material towards the substrate so that they impinge at an angle of not more than 15°, preferably not more than 10° and most preferably not more than 5° to the surface normal of the substrate.

In particular, the apparatus may comprise a peripheral surface surrounding the expansion chamber, wherein at least part of the peripheral surface may comprise an anti-adhesion coating, preferably a perfluoropolyether, PFPE, anti-adhesion coating. Further, at least a part of the peripheral surface may be treated in such a way that the absorption of thermal radiation is increased. Furthermore, at least part of the peripheral surface may be actively cooled.

This results, for example, in the gaseous metallic material not being deposited on the peripheral surface of the expansion chamber. Suitable anti-adhesion coatings of the type long-chain perfluoropolyethers (PFPE) are known from e.g. U.S. Pat. No. 4,022,928. The encased expansion chamber has two decisive advantages. The metal vapor flow is parallelized so that compact layer growth is achieved even at a high coating rate and low substrate temperature. Secondly, the material yield is greatly increased, so that even with a large distance between the evaporation source and the substrate, more than 50%, more than 70% and even more than 80% of the evaporated metal is deposited on the substrate in high vacuum. The active cooling protects the anti-adhesion coating from overheating and—together with the increased absorption of heat radiation—reduces the unwanted heat input by the heat radiation of the gas source, which is unwanted for some substrate types (e.g. HTS tape conductors). In particular, it can be achieved that even at very high deposition rates, heat sensitive substrate types do not overheat and the substrate temperature during the coating remains below 180° C. or even below 150° C.

Alternatively, for less temperature-sensitive substrate types, at least part of the peripheral surface can also be at a temperature at which deposition of the metallic material on the peripheral surface is reduced.

Furthermore, in some embodiments the expansion chamber may have an outlet opening facing the substrate and an inlet opening facing the gas source, wherein the ratio of the diameters of the outlet opening and the inlet opening is at least 1.5, preferably at least 1.75 and more preferably at least 2.0 and/or wherein the ratio of the distance between the inlet opening and the substrate and the distance between the inlet opening and the outlet opening can be at least 1.0, and at most 1.4 and/or wherein the ratio of the distance between the outlet opening and the inlet opening and the diameter of the outlet opening can be at least 1.5.

It turned out that these geometric properties of the expansion chamber can have a beneficial effect on the directivity of the expansion chamber. In particular, a homogeneous, dense and pore-free layer growth can be guaranteed even at high coating rates.

Furthermore, in some embodiments the expansion chamber may widen from the gas source to the substrate, especially in a conical or bell-shaped manner. In particular, the expansion chamber may have the shape of a divergent part of a Laval nozzle.

Such Laval nozzles, or supersonic nozzles, are used in rocket technology to produce directed gas flows in rocket engines, which expand into free space under high pressure. In order to generate the highest possible directional forward thrust, the expanding gas flow is parallelized in a Laval nozzle.

The described embodiment transfers this principle to the use in a vacuum environment, although the gas pressures are many orders of magnitude below those of a rocket engine. As discussed above, to generate a supersonic flow, it may be sufficient that the gas pressure in the vapor of the metal atoms at the exit of the gas source in high rate operation is in the range of $10^2$ Pascal and thus the mean free path length in the metal vapor is in the sub-millimeter range, so that it behaves like a classical gas ensemble due to frequent collisions and interactions of the atoms. The relaxation of the gas (metal vapor) in the divergent part of the Laval nozzle converts thermal energy into kinetic energy and forms a supersonic flow. Lateral momentum components of the metal atoms are converted into forward components and the gas flow is aligned parallel to the nozzle axis. The mean free path length in the expanding gas is preferably much smaller than the geometric dimensions of the Laval nozzle. In order to use this effect efficiently, in some versions of the present invention an expansion chamber is inserted in the space between the evaporation source and the substrate coating level, which corresponds to the divergent part (expansion part) of the Laval nozzle. The conical or bell-shaped expansion chamber can have a round to slightly elliptical diameter to adapt to the geometry of the coating surface.

In particular, in some embodiments, the expansion chamber may have an elliptical or a rectangular cross section with an aspect ratio of at least 1.2, preferably at least 1.5, more preferably at least 2.0 and most preferably at least 3.0.

In this way, the flow cross-section of the gaseous metallic material flowing from the expansion chamber in the direction of the substrate can be adapted to the elongated shape of a foil- or tape-shaped substrate and thus the usable coating area on the substrate can be increased.

Furthermore, the opening of the gas source may have an opening diaphragm, which preferably comprises at least one fin. Furthermore, the gas source and/or the opening diaphragm can be made of a material with a high melting point, preferably tungsten, tantalum, molybdenum, carbon and/or a heat-resistant ceramic.

This can increase the build-up of vapor pressure in the gas source. The preferably lamellar opening diaphragm also reduces the splashing of liquid metal droplets from the gas source, which can be caused by overheating and/or turbulent flow processes.

In a further embodiment, the present invention provides a system for coating a substrate, in particular a superconducting tape conductor, the system comprising: at least one coating zone in which a metallic material is deposited on the substrate, wherein the substrate passes through the at least one coating zone at least twice, or at least two coating zones in which the metallic material is deposited on the substrate, wherein the substrate passes through the at least two coating zones at least once each time.

Such a system may, for example, make it possible to deposit thicker layers on the substrate in a single process step.

In particular, the system may also include a device for changing the orientation of the substrate after a first and before a second pass through the at least one coating zone or before the pass through the second coating zone.

Such a system may, for example, enable both sides of a tape-like substrate, such as an HTS tape conductor, to be coated uniformly; in particular also when, as with some of the apparatuses described above, a flow of coating material particles is directed towards the substrate to be coated.

In a further embodiment, the present invention provides a system for coating a substrate, in particular a superconducting tape conductor, wherein said system comprises at least one coating zone in which a metallic material is deposited on the substrate, the substrate passing through the at least one coating zone at least twice, or at least two coating zones in which the metallic material is deposited on the substrate, the substrate passing through the at least two coating zones at least once each time, and a device for cooling the substrate after a first and before a second pass through the at least one coating zone or before the pass through the second coating zone.

In high rate coating, the main heat input to the substrate is the condensation energy released during film formation. Since the substrate in some embodiments can also be in a high vacuum, it cannot release this heat input via solid state or gaseous heat conduction and heats up depending on its heat capacity. This is very low, especially in the case of thin films and tapes, which limits the maximum film thickness that can be deposited per pass through at least one coating zone in temperature-sensitive substrates. In the case of HTS tape conductors, for example, the maximum temperature in a vacuum environment should remain below 180° C., preferably below 150° C., since above this temperature a deterioration of the HTS layer properties, especially the critical current carrying capacity, can occur due to oxygen loss.

The described embodiment now also allows depositing metal layers of more than 1 μm thickness by passing the substrate several times through the coating zone and cooling it down by the cooling device in between.

In particular, in some embodiments the speed at which the substrate passes through the coating zone(s) can be selected so that the temperature remains below a desired threshold temperature when the coating zone is passed through once. The substrate can then pass through the cooling device before it passes through another or the same coating zone repeatedly. This process can be continued as often as required until the desired total coating thickness is reached. The intermediate cooling device can also be located outside the coating zone(s) and can be effectively decoupled from the coating zone(s). There, for example, the substrate can be cooled down via cooled rollers and solid heat conduction or via increased gas heat conduction to such an extent that the inlet temperature is low enough to compensate for the temperature rise during coating.

In a further embodiment, the present invention provides a system for coating a substrate, in particular a superconducting tape conductor, wherein said system comprises at least one coating zone in which a metallic material is deposited on the substrate, the substrate passing through the at least one coating zone at least twice, or at least two coating zones in which the metallic material is deposited on the substrate, the substrate passing through the at least two coating zones at least once in each case, and at least one gas reflector arranged in or around the at least one coating zone, which reflects particles of the metallic material in the direction of the substrate.

In particular, at least part of the at least one gas reflector may have an anti-adhesion coating and/or at least part of the at least one gas reflector may be treated in such a way that the absorption of thermal radiation is increased and/or at least part of the gas reflector may be actively cooled.

Such a gas reflector significantly increases the material yield of the system, results in a more homogeneous coating of the substrate from all directions and/or reduces the heat input into the substrate.

In particular, in some designs the depositing of the metallic material in the coating zone(s) of the systems described above can be carried out using one of the apparatuses and/or methods described above.

In particular, the systems described above can also be combined with each other, so that, depending on the area of application of the coating system, both a change of orientation of the substrate, intermediate cooling and/or the gas reflector described can be used.

In a further embodiment, the present invention provides a coated superconducting tape conductor comprising: at least one superconducting layer, at least one metallic coating deposited on the tape conductor, wherein the thickness of the metallic coating is at least 1 µm and does not vary by more than 10%, preferably not more than 5%, over the width of the coated tape conductor.

Such a superconducting tape conductor is particularly suitable for applications in which several tape conductors are stacked on top of each other or if, as in the case of a magnet coil, several windings are stacked on top of each other. The low thickness variation of the tape conductor reduces hollow or interstitial spaces and/or tension between the individual layers/windings. Furthermore, the thickness of the coating of more than 1 µm seals the superconducting layer, enables good thermal conduction cooling and provides an effective alternative current path in case of local collapse (quenching) of the superconductivity.

In particular, the at least one metallic coating on the tape conductor may have been produced by one of the methods, apparatuses and/or coating systems described above.

Further, in some embodiments the volume of the at least one metallic coating may consist of less than 5%, preferably less than 3% and more preferably less than 1% of cavities, gaps and/or pores.

Further, in some embodiments the area density of metal particles with an average diameter of at least 10 µm embedded in or deposited on the metallic coating may be less than $5/cm^2$, preferably less than $3/cm^2$, more preferably less than $1/cm^2$ and most preferably less than $0.1/cm^2$.

Further, the metallic coating may comprise gold, silver, copper and/or tin, their alloys or a sequence of these metals and/or may fully envelope the tape conductor.

Furthermore, the thickness of the at least one metallic coating may be at least 1 µm and at most 30 µm, preferably at least 1 µm and at most 10 µm and more preferably at least 3 µm and at most 10 µm.

The homogeneity and purity of the coating achievable by the present invention increases the electrical and thermal conductivity of the coating and improves its hermeticity and mechanical properties. For example, a homogeneous and pure coating is less likely to chip off the substrate.

4. DESCRIPTION OF THE DRAWINGS

Figure 2:
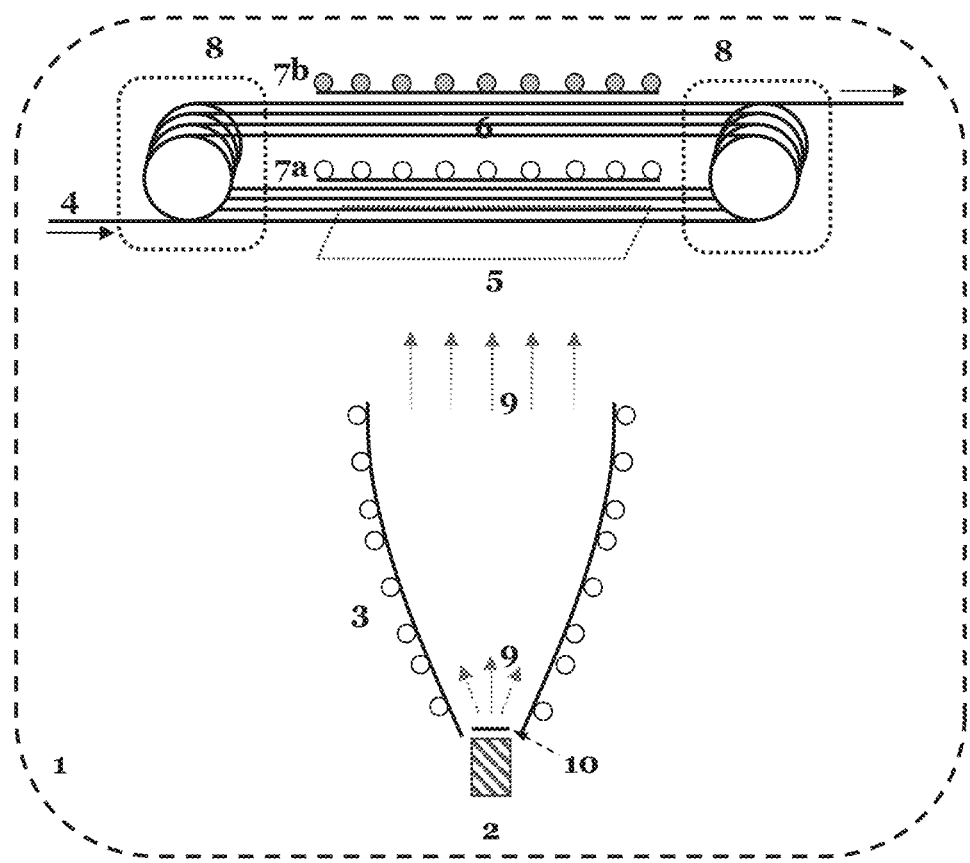
Figure 3A:
Figure 3B:
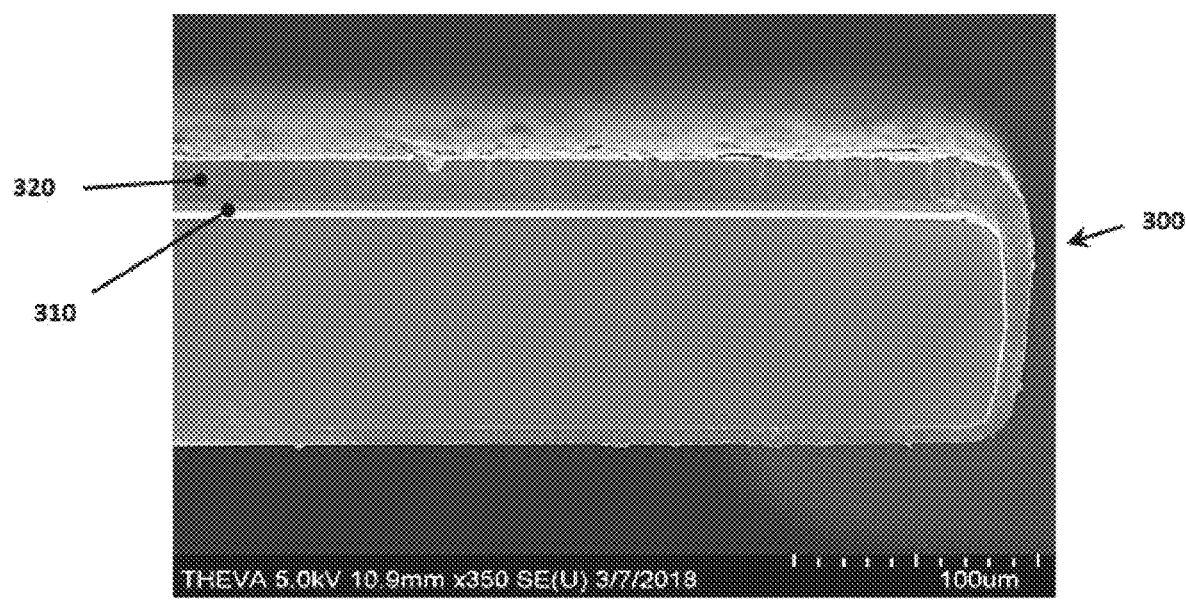
Figure 4A:
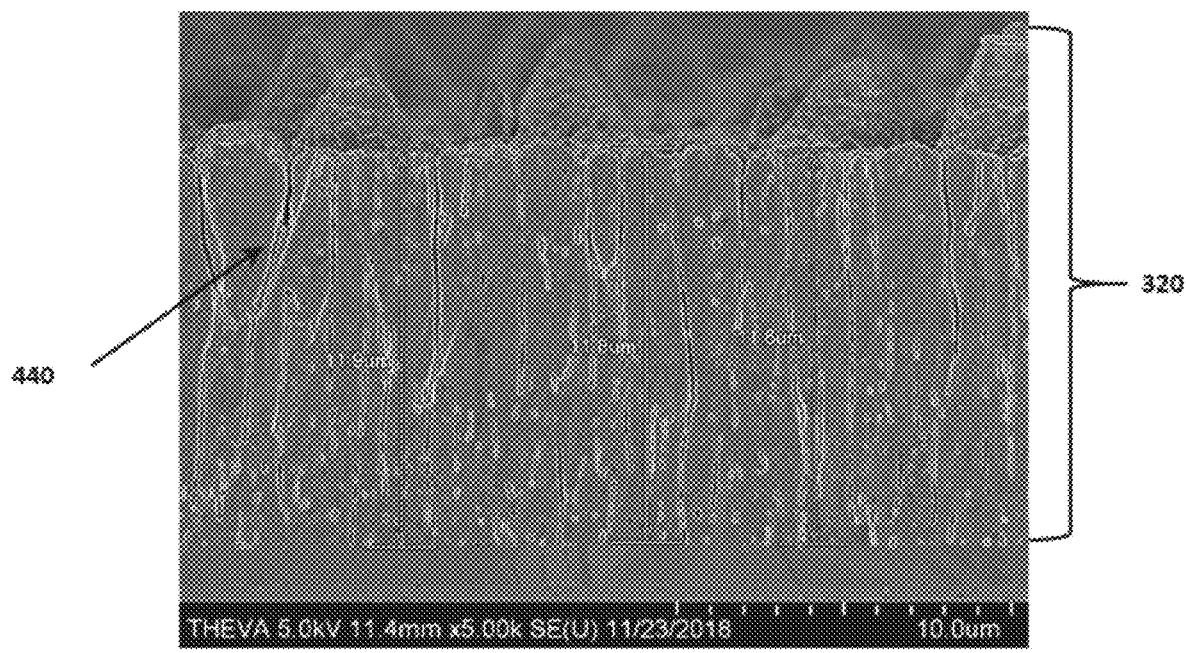
Figure 4B:
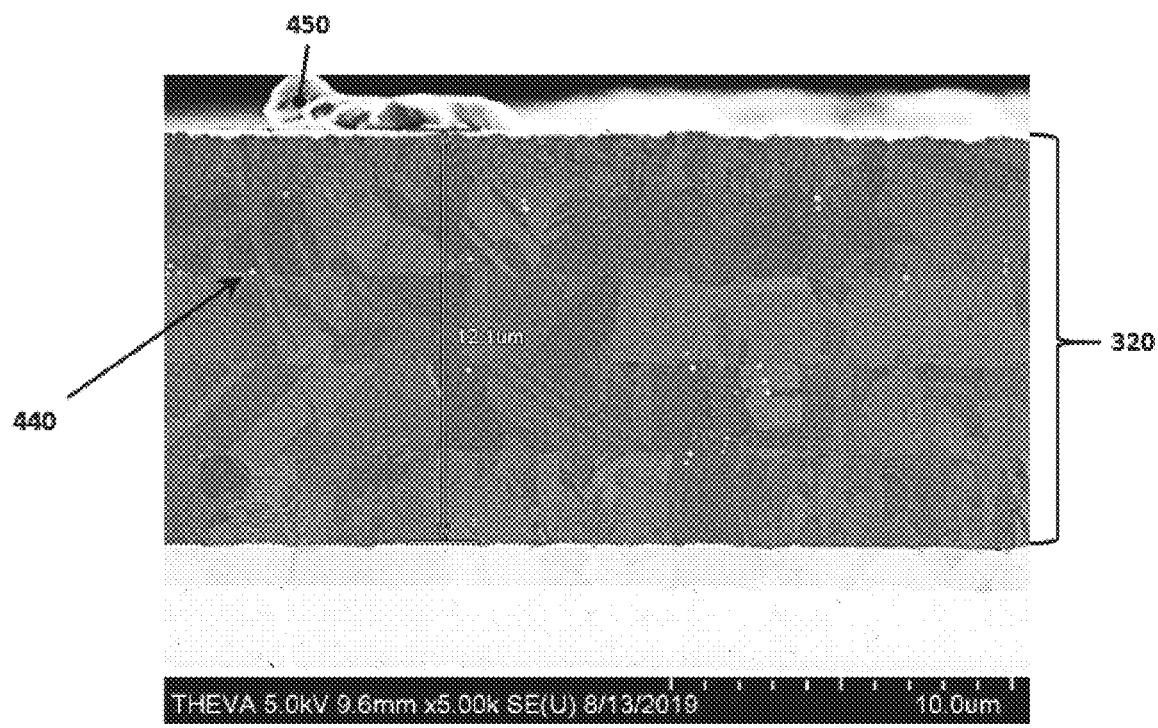

Selected aspects of the present invention are described below with reference to the attached drawings. These drawings show:

FIG. 1 a schematic structure of an arrangement for the PVD metallization of substrates according to an embodiment of the present invention;

FIG. 2 a schematic structure of an arrangement for PVD metallization of tape-shaped substrates with a winder arrangement according to an embodiment of the present invention;

FIG. 3A a cross-sectional preparation of a conventional, galvanically copper-plated HTS tape conductor;

FIG. 3B a cross-sectional preparation of the edge of an HTS tape conductor with surrounding copper coating according to an embodiment of the present invention;

FIG. 4A a cross-sectional preparation of a 12 µm thick silver layer produced by a conventional high rate PVD process;

FIG. 4B a cross-sectional preparation of a 12 µm thick copper layer according to an embodiment of the present invention.

The following reference signs are used in the drawings:
1 vacuum chamber/environment
2 evaporation source/gas source
3 water-cooled expansion chamber/expansion nozzle
4 moving substrate tape (foil)
5 coating zone
6 tape winder/winder arrangement
7a, 7b water-cooled rear reflector/gas reflector
8 intermediate cooling device; 10 diaphragm
D distance between evaporation source and substrate tape
L length of the expansion chamber/expansion nozzle
$O_i$ inlet diameter of the expansion chamber
$O_a$ outlet diameter of the expansion chamber

5. DETAILED DESCRIPTION OF SEVERAL EXEMPLARY EMBODIMENTS

A first embodiment of the present invention is illustrated in FIG. 1. A vacuum system/chamber 1 is pumped down to a residual gas pressure of less than $10^{-2}$ Pascal, preferably less than $10^{-3}$ Pascal, so that reactive metals (e.g. Al, Mg etc.) do not oxidize during evaporation. Chamber 1 contains an evaporation source/gas source 2 for splash-free evaporation of metals. This may be an effusion cell or a crucible which can be heated by an electron beam, a resistance heater or an induction coil until the evaporation material melts and reaches a high vapor pressure in the source in the order of more than 10² Pascal. Preferably, this vaporizer 2 has an covering diaphragm 10 with fins made of a high melting point material such as W, Ta, Mo, C or a ceramic to prevent splashing.

In the upper area of the vacuum chamber 1, the substrate 4 to be coated is continuously moved through the coating zone 5 in the form of a flexible, thin tape or foil above the evaporation source 2. The tape can either come from an unwinding and rewinding device in the vacuum chamber or be continuously fed into the vacuum chamber, as described e.g. in DE 10 2009 052 873.

In order to allow the metal vapor 9 to strike the substrate 4 in the area of coating zone 5 as vertically as possible—within an angular distribution of ±15° to the substrate normal—and thus avoid the column growth and high layer porosity described above, an expansion chamber 3 is installed between evaporation source 2 and coating zone 5.

In the embodiment illustrated here, this expansion chamber 3 corresponds in its function to the divergent expansion part of a Laval nozzle, which is mainly used in the aerospace industry or in turbines to generate and bundle supersonic flows. The expansion chamber or Laval nozzle 3 has an inwardly concave bell shape and a round to slightly elliptical diameter. The lower inlet opening (diameter $O_i$) is slightly wider than the outlet of the evaporation source 2 in order to thermally decouple it. The upper outlet opening (diameter $O_a$) essentially determines the lateral dimension of coating zone 5.

In some embodiments, the expansion chamber 3 with length L reaches close to the coating zone 5, so that as little metal vapor 9 as possible is laterally lost in the gap between expansion chamber 3 and substrate 4. The distance D-L is dimensioned in such a way that the substrate tape 4 does not come into contact with expansion chamber 3 even if it is slightly sagging and is also not contaminated, for example, by the anti-adhesion coating. Typically, the ratio D:L=1 to 1.4

The geometric ratios of the illustrated expansion chamber or Laval nozzle 3 are as follows: The ratio between the outlet and inlet opening of the nozzle $O_a:O_i$ is preferably greater than 1.5, particularly preferably greater than 2, and the ratio of the nozzle length to the outlet opening diameter is greater than $L:O_a=1.5$. The effect of the Laval nozzle thus consists in a high separation rate from a parallel gas flow 9 and a very high material yield.

However, the nozzle shapes (e.g. Laval nozzle) of the expansion chamber described here are only one possible way to achieve the directivity provided by the expansion chamber. Other forms and/or types of expansion chambers are also conceivable and are part of the present invention.

In order to prevent the metal vapor 9 from adhering and condensing on the peripheral surface of expansion chamber 3, the latter is provided with an anti-adhesion coating. Suitable coatings preferably consist of long-chain PFPE compounds (trade name e.g. Fomblin). In order to keep the vapor pressure of the PFPE coating low and to dissipate the heat radiation from the gas source 2, the peripheral surface of expansion chamber 3 is actively cooled, e.g. by well heat-coupled pipes through which water flows. To prevent the peripheral surface of the expansion chamber 3 from reflecting the heat radiation from the gas source 2 onto the temperature-sensitive substrate 4, it is advisable to blacken its surface before applying the anti-adhesion coating so that it absorbs the heat radiation and dissipates it into the cooling water.

With this arrangement, extremely high coating rates can be achieved on the substrate 4. For economic reasons, coating rates of more than 20 nm/s, preferably more than 50 nm/s and especially preferably more than 80 nm/s are targeted. The latter can be easily achieved with the present invention even with copper as coating material. Another important economic aspect is the material yield, i.e. the ratio of the amount of material deposited on the substrate 4 to the amount of material evaporated. With the normally undirected vacuum evaporation and with the usual distances D from source 2 to substrate 4 between 30 cm and 50 cm, the material yield is usually only in the low double-digit percentage range. With the present invention, material yields of more than 50%, preferably more than 70%, and especially preferably more than 80% can be achieved without any problems.

A high coating rate in normal vacuum or high vacuum on thin films or tapes inevitably leads to a high energy input due to the released condensation heat, so that the substrate 4 can heat up very quickly. Many substrate materials, such as plastics or HTS tape conductors are temperature-sensitive and can be irreversibly damaged if a temperature threshold is exceeded. The maximum permissible temperature on the one hand and the heat capacity of the substrate 4 on the other therefore determine how much material can be deposited during a run through the coating zone 5.

The coating rate is thus used to calculate the transport speed for the tape substrate 4. If thicker layers are required, the substrate 4 must be coated several times. This can be done by installing several evaporation units in succession, winding the tape several times through the system along its entire length, or by feeding the tape several times through the same coating zone 5 by means of a winding device 6. The latter is particularly suitable for tape that are narrower than the width of coating zone 5. Of course, all three approaches can also be combined with each other. In addition, for all multiple coatings, after passing through coating zone 5, an intermediate cooling device 8 can ensure that heat is removed from the strip substrate and the temperature is lowered to such an extent that a new coating can take place.

FIG. 2. shows a design of a system for coating substrates and especially tape conductors. For the following investigations HTS tape conductors with a width of 12 mm were coated all around with silver and copper. HTS tape conductors consist of a thin metal strip (e.g. Hastelloy C 276) with a thickness of 30-100 μm, on which metal oxide buffer layers (e.g. MgO) and an HTS functional layer, e.g. cuprates from the class of $RBa_2Cu_3O_7$ (R=yttrium or rare earth elements) such as $GdBa_2Cu_3O_7$, were deposited. The metallization is used for contacting, protection and electrical stabilization of the tape conductor so that it does not burn through in case of overload.

A metallization that is as dense, as smooth and as fully enveloping as possible with very good layer thickness homogeneity is desired. However, the superconducting cuprates tend to lose oxygen by diffusion when heated in a vacuum, which degrades their most important function, the critical current carrying capacity. The coating device in FIG. 2 guides the HTS tape conductor 4 several times through the coating zone 5 via a winder arrangement 6 comprising, for example, 15 tracks (only indicated schematically in FIG. 2).

Outside the coating zone 5, each track runs through an intermediate cooling device 8. In this way, the substrate temperature can be reliably kept below a temperature of 180° C., preferably even below 150° C., throughout the entire coating period and with a layer thickness of more than 30 µm of copper.

A rear reflector 7a, 7b is also installed in the winder 6, which scatters the material flowing backwards through the gaps between the tracks back onto the substrate rear side at 7a or back onto the front side at 7b. The rear reflector is water-cooled in the same way as the peripheral surface of the Laval nozzle 3 and has a anti-adhesion coating. As a result, the material yield could be increased by approximately an additional 10%.

In this case, the HTS tape conductor 4 was coated all around with copper. For this purpose, the tape was twisted as it was running back through the system, i.e. the back side was brought forward. The layer thicknesses on the two main surfaces and the edges of the tape 4 can be adjusted as required by the number of passages, the position of the upper reflector 7a, 7b and the width of the gaps between different winding tracks.

In the manufacture of HTS tape conductors, metal layers of silver, copper, gold and tin, their alloys or a sequence of these metals are preferably used. Even though the process described here is not limited to these metals, they are the focus of the application. HTS tape conductors have therefore been coated with silver and copper with and without the process used in the invention and have been examined in detail. They have characteristic features that enable them to be directly distinguished from tape conductors coated by other metallization processes.

For example, electroplated metal layers on tape conductors show a characteristic increase in layer thickness at the edges, which is inevitable due to the electrical field enhancement at the edge and the larger solid angle from which metal ions can accumulate.

FIG. 3A shows an example of the cross-sectional preparation of the edge of a 12 mm wide and approx. 100 µm thick HTS tape conductor which was conventionally, i.e. galvanically, coated with a copper layer nominally 20 µm thick. All shown cross-section preparations (FIG. 3A, 3B, 4A, 4B) were produced by ion beam etching with Ar ions to ensure a smooth cut edge without mechanical damage to the layer structure.

In the electron microscope image of the cut edge in FIG. 3A at the top of the front side of the metal substrate, the buffer and HTS layers are clearly visible as bright bands. Above and around them is the electrodeposited copper layer. This is dimensionally stable over most of the tape surface with a thickness of 20 µm, but becomes continuously thicker towards the edge of the tape and at 45 µm reaches values more than twice as high at the edge. Although this so-called dog-bone effect can be reduced by suitable arrangement of the anodes in the electrolyte bath, it never completely disappears during depositing at economically interesting rates of more than 20 nm/s, and is therefore a characteristic distinguishing feature over PVD coating, whose layer thickness is practically constant right up to the edge.

In the best case, a thickness ratio of edge to center of 1.2-1.3 is observed for electroplated tape conductors, whereas this ratio is below 1.1, preferably even below 1.05 for the PVD metal layers produced here (see FIG. 3B). This dimensional stability is desired mainly for the construction of magnet coils, since an inhomogeneous conductor thickness leads to unnecessary gaps between the winding layers.

In comparison, FIG. 3B shows the cross-sectional preparation of a tape conductor 300 coated all around with copper using the high rate PVD process of the present invention. Clearly visible in the electron microscopic image of the cut edge in FIG. 3B at the top of the front side of the metal substrate are the buffer and HTS layers 310 as bright bands. In the tape conductor in FIG. 3B, the front and rear sides were coated with different thicknesses, here 14 µm at the front and 6 µm at the rear. The excellent homogeneity of the layer thickness 320 and edge coverage are clearly visible. The variation of the metal layer thickness 320 is less than 10%, preferably less than 5% of the average value.

The present invention thus makes it possible to achieve the high quality of PVD deposited metal layers even in the range of high coating rates and large metal layer thicknesses. The process is particularly suitable for the metallization of HTS tape conductors if between 1-30 µm, preferably between 1-20 µm and especially preferably between 3-20 µm of metal layer thickness are applied on each side.

FIGS. 4A and 4B show a comparison of the results of conventional high rate evaporation (FIG. 4A) and the present invention (FIG. 4B) using two HTS tape conductors coated with 12 µm thick metal layers.

FIG. 4A shows a silver layer in cross section which was produced at a high rate >50 nm/s and intermediated cooling, but without the expansion chamber 3 provided by the present invention. The vapor from the source is reflected back into the chamber by the side walls of a chamber until it impinges on the substrate, where it is incorporated into the metal layer. This causes the vapor to travel from all directions in space (i.e., non-directional) up to grazing incidence on the substrate surface.

In FIG. 4A, the HTS tape conductor at the bottom only shows the interface to the HTS layer and a 1.5 µm thin, crystalline silver layer, which was annealed at temperatures >300° C. after an initial PVD coating. Clearly visible in the high rate silver layer in this arrangement is the column growth, which leads to large pores and gaps 440 in the layer and characteristic surface structures. The thickness variation and roughness is several µm and thus more than 20% of the average layer thickness.

By contrast, FIG. 4B shows the cross-section of a 12 µm thick copper layer 320 deposited on a comparable HTS tape conductor surface with the present invention. On closer inspection, a layer structure can be seen within the copper layer 320, which is the result of multiple passes through the coating zone. In contrast to FIG. 4A, this layer is very dense and smooth. Pores and gaps 440 as in FIG. 4A are almost completely absent.

In the cross-sectional preparation applied here by ion beam etching and electron microscopic observation (magnification 5000×) perpendicular to the substrate surface, cavities or pores 440 make up less than 1% of the cross-sectional area and thus also of the volume of the metal layer 320. The thickness variation of the metal layer 320 measured on this cross-sectional preparation by ion beam etching is at least less than 10% in some embodiments even less than 5% of the average local layer thickness.

The HTS tape conductors 300 produced by one of the embodiments of the present invention are also characterized by a very low area density of metal sputter 450 on the surface. During high rate evaporation, crucibles often experience turbulent processes in the molten metal and spattering due to the strong overheating. The resulting metal droplets 450 have a diameter of >10 µm, can damage the substrate on impact due to local overheating or can be pressed into the underlying HTS layer 310 when the substrate is guided over rollers and break it. Splashing can be effectively avoided by using an evaporation source with a cover plate made of high-melting material such as W, Ta, Mo, C or ceramic. The metal layers 320 produced here are therefore also characterized by a very low surface density <0.1/cm² of splashes and embedded particles 450 with an average diameter of more than 10 µm.

What is claimed is:

1. An apparatus for coating a substrate with a metallic coating, in a vacuum environment, wherein a background gas pressure in the vacuum environment is at most $1 \cdot 10^{-1}$ Pascal, comprising:
 a gas source for generating a metallic material in the gas phase, wherein the vapor pressure of the metallic material in the gas source is at least $1 \cdot 10^1$ Pascal;
 wherein the gas source comprises an opening from which the gaseous metallic material flows into an expansion chamber installed between the gas source and a coating zone for the substrate;
 wherein the expansion chamber is formed as a divergent part of a Laval nozzle having an inlet opening directed to the gas source and an outlet opening directed towards the coating zone such that a flow of the gaseous metallic material is parallelized with respect to the substrate;
 wherein the expansion chamber is coated with an anti-adhesion coating and is actively cooled, and
 wherein a lamellar diaphragm is arranged between the gas source and the inlet opening of the expansion chamber.

2. The apparatus of claim 1, wherein
 the expansion chamber is adapted to convert at least a lateral momentum component of the particles of the gaseous metallic material into a longitudinal momentum component in the direction of the substrate; and/or wherein
 the expansion chamber is adapted to generate a supersonic flow of the gaseous metallic material in the direction of the substrate; and/or wherein
 the expansion chamber is arranged to direct the particles of the gaseous metallic material onto the substrate so that they impinge at an angle of no more than 15°, preferably of no more than 10° and most preferably of no more than 5° to the surface normal of the substrate.

3. The apparatus of claim 1, wherein at least a part of the peripheral surface is treated such that absorption of thermal radiation is increased.

4. The apparatus of claim 1, wherein
 a ratio of a distance between the inlet opening and the substrate and a distance between the inlet opening and the outlet opening is at least 1.0, and at most 1.4, and/or wherein
 a ratio between a distance between the outlet and the inlet opening and a diameter of the outlet opening is at least 1.5.

5. The apparatus of claim 1, wherein
 the expansion chamber widens from the gas source towards the substrate in a conical or bell-shaped manner.

6. The apparatus of claim 1, wherein the expansion chamber is actively cooled by a liquid.

7. The apparatus of claim 1, wherein:
 the opening of the gas source comprises an opening diaphragm, the opening diaphragm having at least one fin; and/or
 the gas source and/or the opening diaphragm is made of tungsten, tantalum, molybdenum, carbon and/or heat-resistant ceramic.

8. The apparatus of claim 1, wherein the substrate is a flexible metal tape passing through the coating zone over the expansion chamber.

9. The apparatus of claim 8, wherein the substrate passes at least twice through the coating zone over the expansion chamber and comprises:
 an intermediate cooling device configured to cool the substrate after a first and before a second pass of the substrate through the coating zone; and/or
 at least one gas reflector arranged in or around the coating zone, the coating zone being configured to reflect particles of the metallic material in the direction of the substrate.

10. The apparatus of claim 9, wherein:
 at least part of said at least one gas reflector comprises an anti-adhesion coating; and/or
 at least part of said at least one gas reflector is configured to increase absorption of heat radiation; and/or
 at least part of the gas reflector is actively cooled.

11. The apparatus of claim 9, wherein the intermediate cooling device is located outside the coating zone and configured to keep a temperature of the substrate below 180° C., throughout an entire coating period.

12. The apparatus of claim 1, wherein the lamellar diaphragm is configured to reduce splashing of liquid metal droplets from the gas source.

* * * * *